United States Patent Office 3,399,036
Patented Aug. 27, 1968

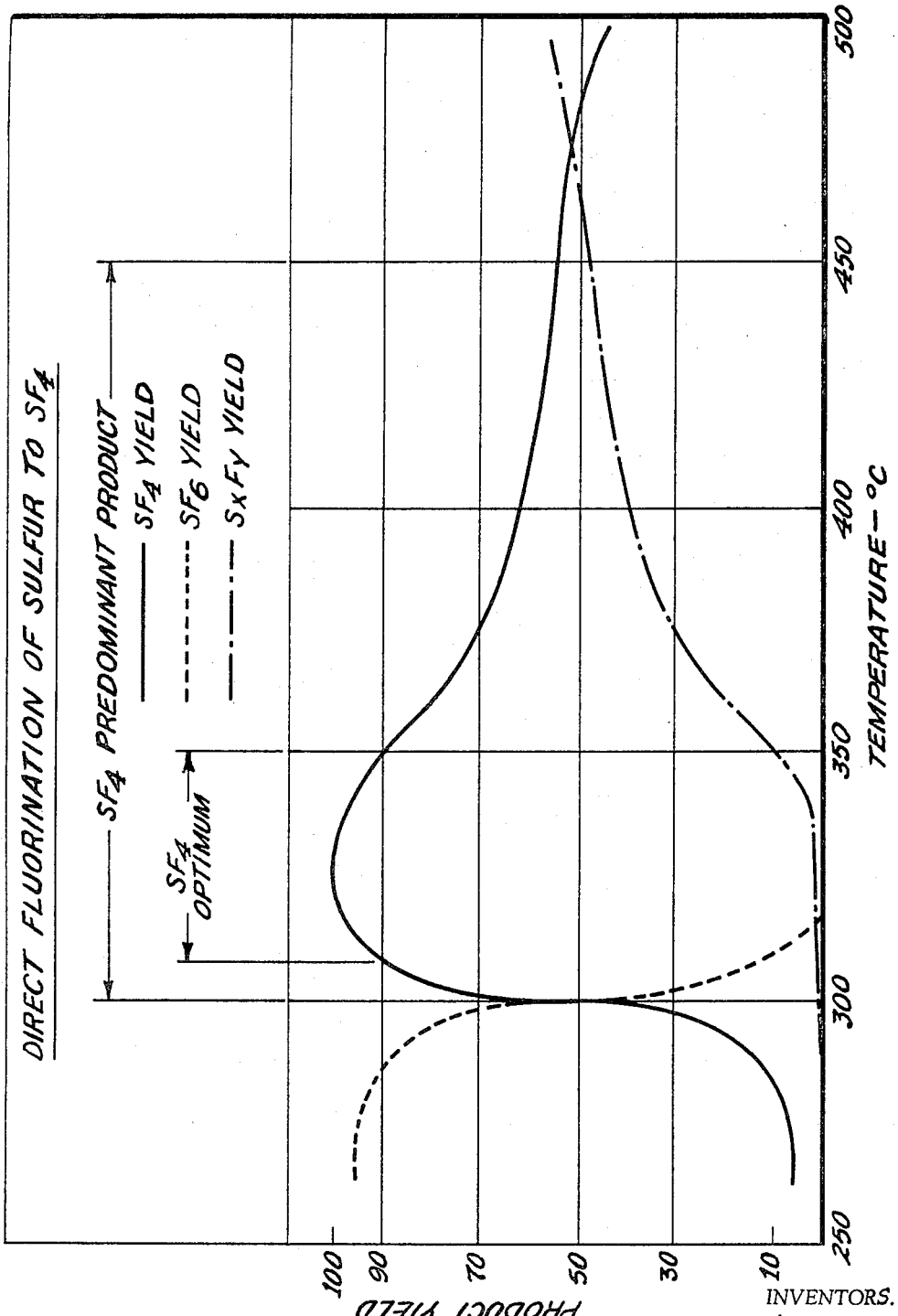

3,399,036
SULFUR TETRAFLUORIDE
Sidney Kleinberg and James F. Tompkins, Jr., Allentown, Pa., assignors to Air Products and Chemicals, Inc., Allentown, Pa., a corporation of Delaware
Filed Apr. 20, 1966, Ser. No. 543,856
8 Claims. (Cl. 23—205)

ABSTRACT OF THE DISCLOSURE

Molten sulfur and gaseous fluorine are reacted under conditions selected to form predominantly $SF_4$, by directing a stream of fluorine gas to contact with a bed of molten sulfur preheated to above 200° C. to effect exothermic reaction at 300–450° C.

---

The present invention is directed to the synthesis of high purity sulfur tetrafluoride from elemental sulfur and fluorine under selected temperature conditions.

Sulfur tetrafluoride, which has been used in small quantities primarily for research applications, is becoming increasingly important in areas such as the conversion to tetrafluoroethylene by reaction with carbon, the preparation of inorganic fluorides of metals, the formation of nongaseous adducts such as $SF_4 \cdot BF_3$, etc. During the past 50 years, repeated attempts have been made to produce high purity $SF_4$ both economically and in quantitative yields; these attempts to prepare $SF_4$ from the elements have been generally unsuccessful.

Sulfur tetrafluoride was synthesized from the elements by Brown and Robinson [J. Chem. Society (1955), 3147] on passing fluorine gas over a film of sulfur deposited on the wall of a glass vessel at —75° C. In an earlier investigation of the sulfur-fluorine reaction at higher temperatures, Schumb and his coworkers [Ind. Eng. Chem., 39, No. 3, 421–2 (1947)], using ceramic boats filled with sulfur in a metal tube, obtained ignition of sulfur in a stream of fluorine and the production of predominantly sulfur hexafluoride together with a small amount of lower sulfur fluorides, such as $S_2F_2$, $SF_4$ and $S_2F_{10}$. More recently, Gall (U.S. 2,555,739) reacted preheated sulfur with fluorine at a reaction temperature of about 200° C., obtaining predominantly sulfur hexafluoride with up to about 15 percent of unidentified lower sulfur fluorides.

It has now been found that $SF_4$ can be produced directly from the elements in high yield and purity at controlled temperatures higher than 200° C. but below the dissociation temperature range (500 to 1000° C.). In view of the demonstrated synthesis of sulfur tetrafluoride in relatively low yields from the elements at —75° C., the production of predominantly (85 percent) sulfur hexafluoride from the elements at reaction temperatures of about 200° C. and the known dissociation of sulfur tetrafluoride at a temperature above 500° C. and preferably at temperatures of 800 to 1000° C., the discovery that sulfur tetrafluoride can be produced in high purity and high yield by the reaction of elemental sulfur and fluorine at temperatures significantly higher than 200° C. was totally unexpected.

Accordingly, an object of the present invention is to provide a novel method for producing sulfur tertafluoride in high yield and of high purity to the practical exclusion of other sulfur fluorides by reacting elemental fluorine and sulfur within a controlled temperature range.

A further object of the invention is to provide novel means for effecting the fluorination of molten sulfur to produce volatile sulfur fluorides and predominantly sulfur tetrafluoride.

Yet a further object of the invention is to provide a method of synthesizing sulfur polyfluorides consisting predominantly of sulfur tetrafluoride by the reaction of elemental sulfur and fluorine under selected temperature conditions.

These and other objectives are accomplished in accordance with the present invention, by (1) bringing elemental fluorine and molten sulfur preheated to a minimum of about 200° C. to 250° C. into contact in a suitable reaction vessel, (2) effecting reaction therein between the gaseous fluorine and preheated liquid sulfur at a temperature of from about 300 to about 450° C. and preferably at a temperature in the range of 310 to about 350° C., as measured in the liquid sulfur in the immediate vicinity of the reaction zone, (3) withdrawing the reactor effluent, (4) cooling said effluent, and (5) recovering a reaction product consisting predominantly to almost exclusively of sulfur tetrafluoride.

Equipment for effecting a reaction between a liquid and a gas is so broadly known that the reactor itself requires no lengthy description. Obviously, the reactor which is employed should be made of materials resistant to the corrosive action of sulfur (liquid and vapor) and to gaseous fluorine at temperatures in the range of 200° to 500° C. and such materials should be capable of machining and assembling into a gas and liquid-tight unit. For example, one reactor which has been used consisted simply of a steel tube 4 inches in diameter, similar to that described by Schumb (cited above) for the production of $SF_6$. In this reactor preheated molten sulfur was reacted with fluorine gas at a temperature between 300 and 450° C., as measured in the liquid sulfur bath at a point within fluorine-sulfur contact area, to produce predominantly sulfur tetrafluoride. A specific demonstration of this operation is set forth in the following example.

EXAMPLE

Molten sulfur (140 g.) was built up to a level of about 2 inches in a 4-inch diameter steel tube reactor and maintained at about that level by continuous addition of sulfur through a charging port. The temperature of the molten sulfur was maintained at about 220° C. by supplementary heaters attached to the reactor. Dry fluorine gas was measured in volume by rotometer and injected into the reaction chamber at about 100 g. per hour about 2 inches above the sulfur level. Under these reaction conditions, the liquid sulfur temperature in the immediate vicinity of the fluorine entry port was maintained at 313° C. Sulfur and fluorine reacted completely. The differential thermal energy between that supplied by the electric heaters and that available in the reaction zone is accounted for by the exothermic heat of the reaction. The product gases were passed out of the reactor through a solids knockout trap, cooled, passed through a cellulose acetate filter to remove suspended sulfur fines and thence to a cryo-cooled condenser-receiver. The product of this operation consisted 97 percent of sulfur tetrafluoride, $SF_4$, with about 3 percent of other products, predominantly (2.5 percent) sulfur oxyfluoride ($SOF_2$), and less than 0.5 percent sulfur hexafluoride ($SF_6$). Over six hours of operation, the total fluorine input was 675 g. and the product yield was 1145 g.

The existance of sulfur oxyfluoride in the reaction product is indicative of the presence of moisture and/or oxygen in the system which probably entered with the fluorine. Thus, the reactants charged to the reactor and the unit itself should, insofar as practical, be free of air and moisture.

The criticality of temperature in effecting the highly selective production of sulfur tetrafluoride is shown in the following table and in the drawing:

REACTOR PRODUCTS

| Reaction zone temperature, °C. | Percent $SF_4$ | Percent $SF_6$ | Ratio $SF_4/SF_6$ | Other $S_xF_y$ cpds. |
|---|---|---|---|---|
| 260 | 7 | 93 | 0.08 | |
| 290 | 15 | 85 | 0.18 | 0.2 |
| 300 | 50 | 50 | 1.0 | 0.5 |
| 310 | 90 | 10 | 9.0 | 1.2 |
| 320 | 96.5 | 0.9 | 99.0 | 2.5 |
| 365 | 75 | 0 | ∞ | ~25 |
| 440 | ~55 | 0 | ∞ | ~45 |

Thus, at temperatures below about 300° C. in the reaction zone, sulfur hexafluoride was found to be the predominant product. However, at temperatures above about 300° C. (and yet well below 500° C.) the reaction product is predominantly sulfur tetrafluoride. At reaction temperatures in the preferred range of 310 to 350° C. the product was partically pure (90 percent or higher) sulfur tetrafluoride.

Physical properties of typically pure sulfur tetrafluoride follow:

Density, g./cc., 200° K. _____ 1.9191
Melting point, ° C. _____ 121
Boiling point, ° C. _____ 40.4
Surface tension, dynes/cm./200° K. _____ 25.7
Approx. crit. temp., ° C. _____ 70

At temperatures above 350° C. the product is predominantly sulfur tetrafluoride with practically no analyzable amount of sulfur hexafluoride. While the $SF_4/SF_6$ ratio remains of the order of 99 to 1 with increasing reaction temperatures above 350° C. a certain byproduct (or byproducts) appears which is neither the tetra- nor the hexafluoro-compound. At higher temperatures (365° C. plus) these byproducts progressively reduce the yield and purity of the sulfur tetrafluoride product. Accordingly, while sulfur tetrafluoride is produced at reaction temperatures higher than 450° C., it is preferable to employ reaction temperatures within the range of 300 to 450° C. to obtain a reaction product consisting predominantly of sulfur tetrafluoride.

In view of the high temperature sensitivity of the reaction, it is necessary that the temperature for $SF_4$ production be determined accurately and maintained in the desired temperature range. The highly exothermic reaction sets up a sharp temperature gradient from the point of fluorine entry through the sulfur bath. While in the above example a liquid sulfur bath temperature of 313° C. was read within 3 inches of the fluorine entry port, a temperature of 200° C. was read just 12 inches downstream from the first point of temperature measurement.

It will be appreciated by those knowledgeable in the art that in such a highly exothermic reaction the temperatures determined at various points in a tube 4 inches in diameter may not be directly transferable to a substantially larger reactor where the problem of heat dissipation is of considerably higher order. In larger reactors, adjustment of temperature may be obtained by varying (1) the degree of sulfur preheat, usually requiring a downward adjustment for a larger unit yet generally holding within the range of from about 200 to about 250° C.; (2) the charging rate for new sulfur; (3) the rate of fluorine entry; (4) the mixing of fluorine with inert gases, such as nitrogen or argon and/or (5) heat dissipation by means of heat exchange elements attached to the fluorination unit. Such differences in operating detail are readily determinable and controllable by those skilled in the art for a given reactor system.

The reaction described above has been effected at atmospheric or near atmospheric pressure. Moderately higher pressures could be used to obtain higher fluorine entry rates or concentrations and higher gas flow rates through the system. However, since the reaction proceeds very favorably under the conditions described, higher pressures are not generally used.

Excellent conversions were obtained when a single jet of fluorine was brought in contact with the bath of molten sulfur. However, with the observation that the sulfur-fluorine reaction is practically complete within, at most, 4 inches from the point of fluorine entry, it is evident that multiple jets of fluorine arranged along the longitudinal axis of a reactor at 3- to 6-inch intervals, or other arrangements for multiple points of sulfur-fluorine reaction, will increase the sulfur tetrafluoride yield proportionately.

A significant feature of any sulfur-fluorine reactor must be the provision of an extended surface for hot molten sulfur to be exposed to a stream of fluorine gas to effect practically complete reaction between fluorine and sulfur with essentially no excess of fluorine nor any substantial amount of unreacted or incompletely reacted sulfur in the reactor effluent. While a steel reactor has been used very effectively, the reactor may be constructed of other materials provided that they are resistant to fluorine and hot liquid or vaporous sulfur at temperatures in the range of 200° to 500° C. Such materials as copper, nickel, or iron reaction flasks, platinum or Hastalloy-lined nickel tubes, stainless steel tubes, etc., may be used. The reactor itself, which may be of various forms, can be positioned horizontally, vertically, or in an intermediate position depending on its structure to permit either countercurrent or concurrent contact between fluorine gas and molten sulfur.

For larger-scale operation a continuous process is preferred. Toward that end, a reactor of the loosely packed vertical column type is effective. In such a unit, preheated molten sulfur moves downwardly from a heater in a thin liquid film over stacked contacting elements having extended surface and made up of refractory materials such as ceramic Raschig rings, perforated steel plates, ceramic Berl saddles and the like. Fluorine gas is passed upwardly in a circuitous or broken path countercurrent to the downward flow of sulfur over the contact elements or plates. Volatile sulfur tetrafluoride, as formed, passes upward and out of the reactor at the top, thence to the solids separator, cooler, filter, and final cryogenic or pressure storage. Such a unit can operate continuously with regulated entry and preheat of sulfur, regulated fluorine feed and product takeoff. Supplementary heating and cooling elements can be provided where necessary to maintain specific reaction temperatures. Since residual sulfur or partially fluorinated sulfur residues will be withdrawn from the bottom of such a vertical reactor, reheated, and recycled to the reactor, the use of a slight excess of sulfur over that theoretically required for the tetrafluoride is preferred.

Another form of reactor which is favored for the process consists of an internally heated metal drum enclosed in a metal casing. Sulfur is melted and distributed from a sulfur heater onto the metal drum rotatable within the metal casing. Fluorine is entered in the annular space at the lower level between the drum and the casing. Fluorine gas thus moves upwardly countercurrent to the film of sulfur on the rotating drum. Sulfur tetrafluoride, as formed, is removed as vapor from the upper end of the casing for condensation and product recovery, while residual liquid on the drum is carried back to the heater, or removed from the drum and separately reheated and recycled to the point of sulfur entry.

Obviously, many modifications and variations of the invention as hereinbefore set forth may be made without departing from the spirit and scope thereof, and therefore only such limitations should be imposed as are indicated in the appended claims.

What is claimed is:

1. The process for producing sulfur fluorides at high yields of sulfur tetrafluoride, which comprises contacting fluorine gas and molten sulfur in a reaction zone at 300° to 450° C., withdrawing volatile reaction product from said reaction zone and recovering sulfur tetrafluoride from said reaction product.

2. The process of claim 1 wherein sulfur and fluorine are contacted at a temperature of 310° to 350° C. forming principally sulfur tetrafluoride.

3. The process of claim 1 wherein the fluorine gas is substantially anhydrous, minimizing formation of sulfur oxyfluorides.

4. The process of claim 1 wherein the sulfur is preheated to a temperature of from about 200 to about 250° C.

5. The process of claim 1 wherein the reaction zone contains contact means having high surface area for distribution of molten sulfur and fluorine and wherein fluorine gas moves countercurrent to the flow of molten sulfur through the reaction zone.

6. A method for producing sulfur tetrafluoride from elemental sulfur and fluorine which comprises (a) contacting at least one stream of fluorine gas with molten sulfur in a reaction zone to effect reaction between sulfur and fluorine at a temperature between 300° and about 450° C., measured at the locus of contact, (b) withdrawing volatile reaction product from said reaction zone, (c) cooling said volatile reaction product to condense sulfur vapors, and (d) recovering sulfur tetrafluoride from the reaction product.

7. The method of claim 6 wherein the sulfur and fluorine are contacted at a temperature in the range of from 310 to 350° C.

8. The method of claim 7 wherein the sulfur is preheated to a temperature of from about 200 to about 250° C.

References Cited

UNITED STATES PATENTS

| | | | |
|---|---|---|---|
| 739,374 | 9/1903 | Baker | 23—205 |
| 2,555,739 | 6/1951 | Gall | 23—205 |
| 2,907,636 | 10/1959 | Smith | 23—203 |
| 3,054,661 | 9/1962 | Muetterties | 23—205 |

OTHER REFERENCES

Supplement to Mellor's Comprehensive Treatise on Inorganic and Theoretical Chemistry, supp. II, part I, pp. 16 and 199, Longmans Green & Co., London, 1956.

OSCAR R. VERTIZ, *Primary Examiner.*

G. PETERS, *Assistant Examiner.*

UNITED STATES PATENT OFFICE
CERTIFICATE OF CORRECTION

Patent No. 3,399,036                                                 August 27, 1968

Sidney Kleinberg et al.

It is certified that error appears in the above identified patent and that said Letters Patent are hereby corrected as shown below:

Column 3, in the table, lines 2 and 3, "121" and "40.4" should read -- -121 -- and -- -40.4 --; same column 3, line 24, "partically" should read -- practically --.

Signed and sealed this 13th day of January 1970.

(SEAL)
Attest:

Edward M. Fletcher, Jr.                              WILLIAM E. SCHUYLER, JR.
Attesting Officer                                                     Commissioner of Patents